Sept. 4, 1923.

D. S. KENNEDY

TIRE

Filed Nov. 18, 1922

WITNESSES

INVENTOR.
DONALD STEWART KENNEDY.
BY
ATTORNEYS.

Patented Sept. 4, 1923.

1,467,172

UNITED STATES PATENT OFFICE.

DONALD S. KENNEDY, OF NEW YORK, N. Y.

TIRE.

Application filed November 18, 1922. Serial No. 601,767.

*To all whom it may concern:*

Be it known that I, DONALD STEWART KENNEDY, a citizen of the United States of America, and a resident of the city of New York, borough of the Bronx, in the county of Bronx and State of New York, have invented a new and Improved Tire, of which the following is a description.

My invention relates to tires for vehicles and more particularly to a solid tire.

The general object of my invention is to produce a solid tire having increased resiliency while preserving strength and durability of the tire; and to carry out the invention in a manner to provide non-skid members on the tread.

The nature of the invention and its distinguishing features and advantages will clearly appear as the description proceeds.

Reference is to be had to the accompanying drawing forming a part of this specification, it being understood that the drawing is merely illustrative of one example of the invention.

In the illustrated example the letter A indicates a known form of tire rim and adapted to receive the tire designated generally by the numeral 10. Said tire 10 is of solid form as distinguished from a pneumatic tire.

Figure 1:
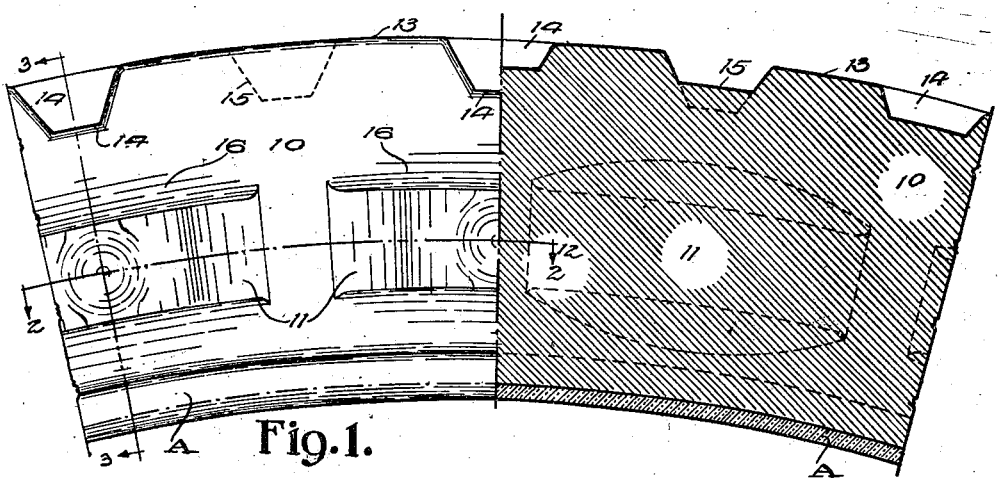
Figure 1 is a partly sectional side elevation, the plane of the section being indicated by the line 1—1, Figures 2 and 3.
Figure 2:
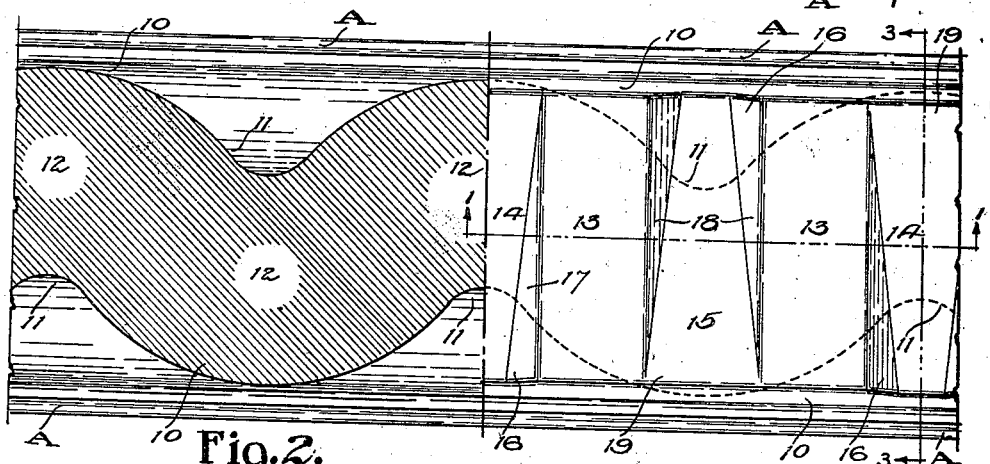
Figure 2 is a partly sectional plan view, the plane of the section being indicated by the line 2—2, Figures 1 and 3.
Figure 3:
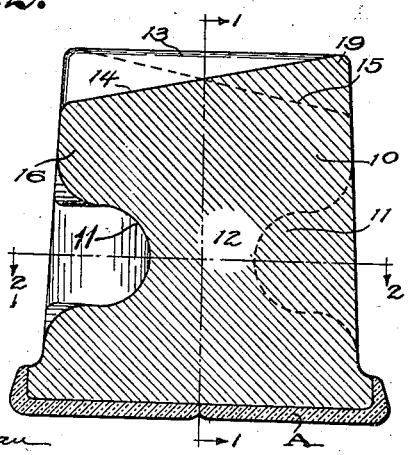
Figure 3 is a cross section as indicated by the lines 3—3 in Figures 1 and 2.

To produce resiliency in the tire notwithstanding its solid character I form at alternately opposite sides, depressions 11 extending laterally inward, those depressions 11 at one side of the tire being in staggered relation to the similar depressions 11 at the opposite side. The result of the depressions 11 is to give the tire body a serpentine form to present sinuosities 12 as viewed in sectional plan and as shown clearly in Figure 2. While the tire is of sinuous form radially inward of the tread, said sinuosity of the tire does not extend to the tread surface nor to the base, the depressions 11 being undercut, thereby producing overhanging portions 16 radially outward of said depressions 11 and a base portion of full width radially inward of the depressions.

The tire presents a series of tread members 13 alternating with which are transverse grooves, the alternate grooves being designated respectively 14 and 15. The grooves 14, 15 are of gradually increasing depth from one side of the tire to the opposite side. The grooves 14, 15 deepen in opposite directions, that is, the deep portions of one set of the grooves as 14 being at one side of the tire and the deep portions of the others as 15 at the opposite side of the tire. Moreover, the side walls of the grooves 14, 15 are bevelled the width gradually increasing from one side to the other, said side walls and the bottom surface merging into a tread surface level with the tread members 13.

The purpose of bevelling and tapering the side walls 17, 18 of the respective grooves 14, 15 is to give said grooves 14, 15 narrow width at one end, the narrow end of the grooves 14 being at the opposite side of the tire from the narrow ends of the grooves 15. Thus, the grooving of the tire results in a minimum cut-away portion at one end of the groove. The formation of the tire with the undercut side recesses 11 and the grooves 14, 15 results in a substantially uniform resiliency in the tire. Also, at a given cross section of the tire through a groove 14, for example, and the overhanging portion 16 beneath the deepest portion of said groove and at the opposite side of the tire there will be a member 19 defined by the walls of the grooves 14, 15 and that side wall of the tire opposite the member 16 referred to so that the tread of the tire at said opposite side will yield readily with the yielding of the adjacent tread members 13. Thus, the pressure is taken by two adjacent members 13 and by the solid portion of the tire at one end of a groove and thus the overhanging member 16 between the said adjacent tread members 13 will be protected and will not be subjected to severe pressure until a condition is reached under the pressure when the inclined bottom surfaces of adjacent grooves 14, 15 and the tread members 13 will have been flattened to an extent to bring the bottoms of the grooves and the tread surfaces of the members 13 in the same transverse plane. The load will therefore be resisted by the whole cross section of the tire and will not be unduly effective on the overhanging members 16, as the members 19 at a given side of the tire alternate with the recesses 11 at that side of the tire and therefore a given member 19 at a given side of the tire will be in transverse alinement with the recesses 11 and with an overhanging member 16 at the opposite side of the tire causing thereby the members 19 to first take the load, as said members come to the under side of the tire and prior to the load being imposed on the overhanging members 16. Thus, both the members 16 and 19 possess marked resiliency and jointly take the pressure as the tire flattens to bring the tread surface of the member 19 and the transverse alining surface of a member 16 into the same horizontal plane.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. As a new article of manufacture, a tire having undercut recesses extending laterally inward alternately at opposite sides so that the recesses at one side are in staggered relation to the recesses at the other side, the tread surface of the tire presenting tread members and transverse grooves alternating with said members, alternate grooves deepening toward opposite sides of the tread and the deeper ends of the respective grooves being radially outward of and in line with the respective recesses.

2. As a new article of manufacture, a tire having undercut recesses extending laterally inward alternately at opposite sides so that the recesses at one side are in staggered relation to the recesses at the other side, the said tire presenting at the tread at alternately opposite sides, members projecting beyond the level at the opposite side of the tire, the said projecting members being in positions alternating with the positions of the recesses at the same side of the tire.

3. As a new article of manufacture, a tread having undercut recesses alternately at the opposite sides so that the tire radially inward of the tread surface presents a sinuous form; together with transverse tread members on the tire and alternating transverse grooves.

4. As a new article of manufacture, a tread having undercut recesses alternately at the opposite sides so that the tire radially inward of the tread surface presents a sinuous form; together with transverse tread members on the tire and transverse grooves between said tread members, said alternate grooves each deepening gradually toward one side of the tire alternately.

5. As a new article of manufacture, a tire having recesses extending laterally inward alternately at opposite sides radially inward of the tread surface of the tire, said tire at the tread having transverse tread members and grooves alternating with the tread members, each of said grooves gradually deepening from one side of the tire to the other in opposite direction with respect to each other, said deeper ends being in radial alinement with the deepest portions of said recesses.

6. A solid tire having a plurality of undercut recesses extending laterally inward at both sides of the tire, the recesses at one side being disposed in staggered relation with respect to the recesses at the opposite side, the tire on its tread surface being formed with transverse grooves which deepen toward one end alternately, the deep portion of said grooves being disposed immediately above said recesses.

DONALD S. KENNEDY.